Feb. 12, 1952 R. W. SANDERS 2,585,044
GAIN CONTROL APPARATUS
Filed Feb. 5, 1945
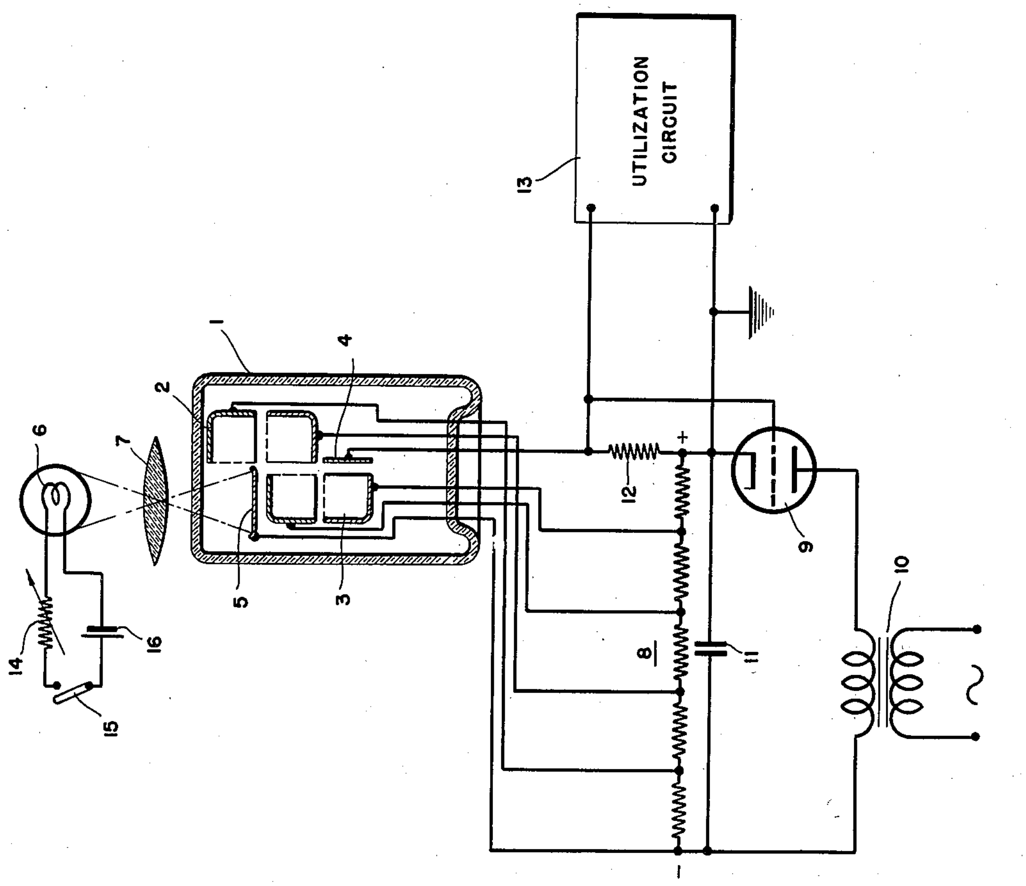
INVENTOR
ROBERT W. SANDERS
BY [signature]
ATTORNEY Patented Feb. 12, 1952 2,585,044

UNITED STATES PATENT OFFICE 2,585,044

GAIN CONTROL APPARATUS

Robert W. Sanders, Fort Wayne, Ind., assignor, by mesne assignments, to Farnsworth Research Corporation, a corporation of Indiana Application February 5, 1945, Serial No. 576,231

5 Claims. (Cl. 179—171)

This invention relates to signal control systems and particularly to systems for effecting automatically the control of signal level.

In signalling systems a common practice is to represent intelligence by varying amplitude signal effects. In such systems the extremes of intelligence of any character such as light or sound are represented by the maximum and minimum instantaneous amplitudes of the signal effects. If the difference between maximum and minimum amplitudes or peak-to-peak value, as it is sometimes called, of the signals does not change over a period of time, then the average value of the signal effects remains substantially constant.

However, the peak-to-peak value of such signal effects very often changes for any one of numerous reasons. In the case where one intelligence extreme always is represented by a signal effect of the same amplitude, any change produced in the peak-to-peak value of the signal effects produces a distorted relationship of this intelligence extreme to intelligence of the other extreme. For example, where the intelligence to be conveyed by means of signal effects has the character of light, a black object always is represented by the same signal amplitude for the reason that, regardless of the intensity of the illumination of the object, it does not reflect any light. A white object on the other hand reflects light in proportion to its illumination. If there is an increase in the illumination, there is effected a corresponding increase in the light reflected from the white object and a consequent increase in the representative signal amplitude; but there is no change in the signal amplitude representative of a black object. The true relationship between the black and white objects is not changed but there is produced a change in the relationship between the respective representative signals. Hence, there is effected a variation of the peak-to-peak and also of the average values of the signal effects.

In order to eliminate the type of distortion referred to, it is necessary to control the signal level in such a manner as to maintain the peak-to-peak value thereof substantially constant. One manner in which such control usually is effected is by means of an amplifier provided with automatic gain control facilities. These usually comprise the connection of a rectifier in the output circuit of the amplifier, whereby a portion of the output circuit energy is converted into a unidirectional voltage varying in accordance with the average peak-to-peak value of the signal effects impressed upon the amplifier input circuit. This unidirectional voltage is fed back to the input circuit, usually as a grid bias, to effect the desired gain control.

However, such an automatic gain control is susceptible of use only with grid controlled vacuum tube amplifiers. There are many signalling systems in which it is preferable to employ an electron multiplier as the amplifier for the signal effects. An electron multiplier is particularly useful where the signal effects produced are in the form of currents of free electrons in space. Devices such as electron multipliers are susceptible of gain control by means other than control grids. Ordinarily it is desirable to effect the gain control of an electron multiplier without making use of a control grid for the reason that the multiplier structure may be simplified by the omission of an electrode of this type. A commonly employed and an effective expedient for controlling the gain of an electron multiplier without resorting to a control grid is to vary the unidirectional energization of one or more of the electrodes, whereby to effect a modification of the electron space current flow between electrodes. Grid-controlled space discharge vacuum tubes also are susceptible of control in like manner.

It is an object of the present invention, therefore, to provide a gain control system for an amplifier, whereby the signal level is controlled in a desired manner by effecting a variation of the unidirectional energization of the amplifier in a novel manner.

In accordance with this invention there is provided, in conjunction with a source of signal effects, an amplifying device for these signal effects having at least two electrodes between which there is a flow of electron space current. The input circuit of the amplifier is coupled to the signal source. A supply of unidirectional energy also is provided for the amplifier electrodes. Further, there is provided means responsive to the electron space current for varying the magnitude of the unidirectional energization of the electrodes as a function of the average amplitude of the signal effects, whereby to correspondingly vary the amplification factor of the amplifying device.

More specifically, in accordance with a preferred form of the invention, the amplifier consists of an electron multiplier having at least one secondary electron emissive electrode or dynode and an electron collecting electrode. The unidirectional energization of the multiplier electrodes is effected by connecting these electrodes to an energy source of suitable character. This source may include a vacuum tube serving, for example, as a rectifier for converting alternating current into the desired unidirectional energy. The conductivity of this tube is varied under the control of means responsive to the electron space current flow to effect the desired variation of the unidirectional energization of the multiplier electrodes.

For a better understanding of the invention, together with other and further objects thereof, reference is had to the following description, taken in connection with the accompanying drawing, and its scope will be pointed out in the appended claims.

In the accompanying drawing, the single figure is a schematic circuit diagram of a signal amplifying system embodying the instant invention.

Referring now to the drawing, there is shown an electron multiplier of the multistage type which is mounted within an evacuated envelope 1. The multiplier comprises a serially arranged plurality of secondary electron emissive electrodes or dynodes such as the first stage dynode 2 and the fourth or final stage dynode 3. It will be understood that the invention is not limited to use with electron multipliers of the type illustrated herein by way of example; neither is the number of multiplying stages necessarily limited to four, as shown. The multiplier also is provided with an electron collecting electrode 4 located adjacent to the final stage dynode 3.

The source of electrons for multiplication is illustrated herein by way of example as a photoelectric electrode, such as a photosensitive electron emissive cathode 5. Light from a source such as the lamp 6 is projected in any suitable manner such as by an optical system represented by the lens 7 upon the sensitized surface of the cathode 5. The source of electrons to be multiplied may consist of any conventional electron source such as an image analyzing tube employed in a television system. In such a case the electrons admitted to the multiplier may be derived systematically from different elemental areas of the cathode by any well known scanning process.

The electron multiplier operates on the principle of causing the impingement of electrons upon the secondary electron emissive surface of any of the dynodes with sufficient velocity to liberate secondary electrons in a ratio greater than 1. The secondary electrons liberated from any of the dynodes are drawn toward the succeeding dynode and are given sufficient velocity to impinge upon this succeeding dynode with sufficient force to again liberate additional secondary electrons. The accelerating voltages impressed between successive dynodes of the multiplier, consequently, are required to be increasingly more positive. A conventional power supply for an electron multiplier of this type includes a voltage divider such as the illustrated divider 8. The voltage divider consists of the series connection of a plurality of resistors and has unidirectional energy applied to the terminals thereof.

This energy usually is derived by rectifying alternating current. In accordance with one apparatus embodying the instant invention, there is employed a grid-controlled vacuum tube 9 which serves to rectify the alternating current. The cathode of the tube 9 is connected to the positive terminal of the voltage divider 8. The anode of the tube is connected through the secondary winding of a transformer 10 to the negative terminal of the voltage divider. The primary winding of the transformer is connected to a source of alternating current, such as a commercial 60 cycle circuit, for example. A filter condenser 11 is connected between the terminals of the voltage divider 8 to remove the major portion of the alternating current ripple produced by the rectifier.

The electron collecting electrode 4 of the multiplier is connected through a load resistor 12 to the positive terminal of the voltage divider 8. The terminals of the load resistor may then be connected, as shown, to a utilization circuit 13. Additionally, in accordance with the present invention, the ungrounded terminal of the load resistor 12, which is connected to the collector electrode 4, is coupled to the control grid of the rectifier tube 9 for the purpose of varying its conductivity in accordance with changes in the average peak-to-peak value of signal voltages developed in the load resistor.

Merely by way of example, in describing the operation of the apparatus embodying the invention, the filament of the lamp 6 is shown as connected through an adjustable resistor 14 and a switch 15 to a source of energy such as a battery 16. It is to be understood that the illustration of this means for varying the intensity of the illumination of the cathode is entirely diagrammatic. In effect, it is equivalent to a variation of the average illumination of a television subject, for example, in a case where the cathode 5 corresponds to the photosensitive electrode of a television image analyzing tube.

Referring now to the operation of the apparatus embodying the present invention, assume that the resistor 14 is adjusted so as to effect the emission by the lamp 6 of light having a normal intensity. With the switch 15 open, there is no light from the lamp 6 projected onto the cathode 5. This condition is equivalent, in a television image analyzing tube, for example, to the scansion of an elemental area representative of a black portion of the subject. With the switch 15 closed, light of an intensity determined by the adjustment of the resistor 14 is projected onto the cathode and, it is assumed in the case of a television system, corresponds to the scansion of an elemental area of the photoelectric electrode representative of a white portion of the subject. By alternately opening and closing the switch 15, the cathode 5 is subjected to time-spaced light impulses. In this manner there is effected the emission from the cathode 5 of a series of time-spaced electronic impulses representative of the light projected onto the cathode, if it is assumed that all extraneous light is excluded from the cathode. In a practical case, however, there generally is some electron emission from a photosensitive electrode, such as the cathode 5, which is caused by extraneous light. In such a case, however, when the lamp 6 is not energized it may be assumed that the electron emission from the cathode is a constant minimum. Thus, in this case there will be admitted to the multiplier a stream of electrons having a density varying between maximum and minimum limits to represent the "on" and "off" conditions, respectively, of the lamp 6.

After multiplication by the electron multiplier in a conventional manner, the electrons collected by the collecting electrode 4 vary in numbers between maximum and minimum limits in the same ratio as the electrons emitted from the cathode 5. The collected electrons are caused to traverse the load resistor 12 to effect the development therein of signal voltages, also varying in the same ratio as the electron variations between maximum and minimum values. These signal voltages are impressed upon any desired utilization circuit in the usual manner.

Suppose now that the resistor 14 is readjusted to effect an increase in the light emitted by the lamp 6. In this case the electron emission from the cathode 5 during the open periods of switch 15 will be the same as in the previously described case. However, the emission during the closed periods of the switch 15 will be considerably greater in response to the increased intensity of the cathode illumination. As a result, a corresponding increase will be effected in the amplitude of the signal voltage developed in the resistor 12 in response to the conditions of lamp energization. However, the amplitude of the voltage developed in the resistor 12 representative of the unenergized periods of the lamp 6 will be the same as in the previously described case. The effect is that the range of voltage between the maximum and minimum signals is greater in the second case than in the first. In other words, there is effected an increase in the average peak-to-peak value of the signal voltage.

This voltage, at the ungrounded terminal of the resistor 12, is of negative polarity relative to ground. Hence, the effect of an increase in the average signal voltage is to render the control grid of the rectifier tube 9 more negative relative to its associated cathode. Under the assumed conditions then, the average conductivity of the rectifier tube is decreased. The grid-to-cathode voltage of the rectifier tube changes substantially concurrently with variations of the instantaneous signal voltages. However, the condenser 11 and the resistive voltage divider 8 act as an averaging circuit to translate the relatively rapid changes in conductivity of the rectifier into a relatively slow variation of the rectified energy. By this means then, in the case under consideration, the magnitude of the unidirectional power supplied to the voltage divider 8 and thence to the various multiplier electrodes is decreased. As a result, the accelerating voltages impressed upon the respective dynodes such as 2 and 3 is decreased and the electrons impinging upon these electrodes have a reduced velocity so that a smaller number of secondary electrons are emitted. Thus, the multiplication ratio of each of the multiplier stages and also the overall multiplication ratio of the entire multiplier is reduced. By a suitable choice of circuit constants the reduction effected in the multiplication ratio in response to a tendency for the signal voltage developed in the load resistor 12 to increase by a given amount may be regulated to suit the particular use for apparatus of the character described.

It should be obvious that any tendency for the developed signal voltage to decrease in its average peak-to-peak value will effect the impression upon the control grid of the rectifier tube 9 of a less negative voltage relative to its associated cathode so that the conductivity of the tube will be increased with the consequent increase in magnitude of the unidirectional power supply for the multiplier. In this manner the overall multiplication ratio of the multiplier will be increased appropriately to maintain the average peak-to-peak value of the developed signals substantially constant.

It is contemplated that the principles underlying the present invention are susceptible of embodiment in apparatus other than that specifically described herein by way of illustration. For example, instead of using a grid-controlled rectifier such as the tube 9, the gain control may be effected by impressing the developed signal voltage upon the control grid of a conventional so-called "rheostat tube" connected in series with a rectified power supply which is provided with a voltage regulator employing such a rheostat tube in a well known arrangement. Also, the unidirectional energization of the space discharge path of a conventional grid-controlled vacuum tube may be varied as taught herein for an electron multiplier for the purpose of effecting a gain control of the tube.

Likewise, the underlying principles of the present invention may be utilized in cooperation with amplifying apparatus wherein it is desired to effect a signal expansion. In a television system, for example, signal expansion sometimes is employed to effect an increase in the picture contrast. In other words, the generated signals representative of dark picture areas are modified in such a manner to represent darker picture areas and, similarly, the generated picture signals representative of lighter picture areas are modified oppositely to represent even lighter areas. Such a result may be secured easily by use of the present invention by resorting to the simple expedient of reversing the polarity of the control voltage derived from the amplified signals for impression upon a unidirectional power regulating tube such as the rectifier tube 9.

With reference to the illustrative embodiment disclosed herein, for example, a signal expansion may be effected by including a phase inverter in the coupling between the ungrounded terminal of the load resistor 12 and the control grid of the rectifier tube 9. Similarly, where the signal amplifier consists of an electron multiplier, as disclosed herein, a control voltage of positive polarity varying in accordance with variations of the average peak-to-peak values of the signals may be derived from the circuit which supplies the accelerating voltage to one of the multiplier electrodes in much the same manner as it is derived from the circuit connecting the electron collector with the voltage divider 8. In the present disclosure, for example, the conductor leading from the final multiplier stage 3 to the voltage divider may include a voltage dropping resistor in series therewith. Such a circuit arrangement is conventional in multiplier operation where advantage is to be taken of the fact that the voltage of a multiplying electrode increases in positive polarity with an increase of the electron current flow to and from the electrode. An example of such an arrangement is disclosed in an abandoned application for patent of Madison Cawein, Serial No. 533,523 filed May 1, 1944 and entitled "Amplifiers." In such a case then the control grid of a tube such as the rectifier 9 may be connected to one of the dynodes such as 3.

It, furthermore, is contemplated that the instant invention may be utilized in conjunction with a multistage electron multiplier in such a manner that the rectifier which is subject to control, supplies unidirectional energy only to some of the multiplier electrodes. In such a case it is preferable, but not absolutely essential, that the energization of the final few dynodes be varied to effect the gain control. The energization of the first few dynodes of the multiplier may be varied if desired, but the effectiveness of the gain control will not be great for the reason that the electron densities are inherently less in these stages than in the final stages.

While there has been described what, at present, is considered the preferred embodiment of the invention, it will be obvious to those skilled in the art that various changes and modifications may be made therein without departing from the invention, and therefore, it is aimed in the appended claims to cover all such changes and modifications as fall within the true spirit and scope of the invention.

What is claimed is:

1. An automatic gain control system comprising, an electron multiplier having at least one dynode and an electron collecting electrode, a source of electrons for deriving signal effects for said multiplier, a load impedance having one terminal coupled to said collecting electrode for developing a voltage thereacross representative of the amplitude of electrode current flow through said multiplier, a source of alternating current, means including a vacuum tube rectifier coupled between said alternating current source and another terminal of said load impedance for providing unidirectional dynode potential and electrode current for said multiplier, means for applying the voltage developed across said load impedance for controlling the operation of said rectifier, whereby the magnitude of unidirectional electrode current supplied to said multiplier varies inversely to the variations of the average amplitude of the voltages developed in said load impedance.

2. An automatic gain control system comprising, an electron multiplier having a plurality of dynodes and an electron collecting electrode, a source of electrons for deriving signal effects for said multiplier, a two-terminal load impedance having one terminal coupled to said collecting electrode for developing a voltage thereacross representative of the amplitude of the electrode current flow through said multiplier, a source of alternating current, means including a vacuum tube rectifier coupled between said alternating current source and the second terminal of said load impedance for providing unidirectional dynode potential and electrode current for said multiplier, said rectifier having conductivity varying means, said conductivity varying means connected in shunt with said load impedance, whereby the magnitude of unidirectional electrode current supplied to said multiplier varies inversely to the variations of the average amplitude of the voltage developed across said load impedance.

3. An automatic gain control system as claimed in claim 2 wherein said rectifier tube comprises an anode, a cathode and a control electrode, said anode connected to one terminal of said alternating current source, said control electrode connected to the first terminal of said load impedance and said cathode connected to the second terminal of said load impedance whereby the grid-cathode voltage of said rectifier tube is varied in accordance with the changes in voltage developed across said load impedance and the anode-cathode conductivity of said rectifier is altered in accordance with the changes of said grid-cathode voltage.

4. An automatic gain control system as claimed in claim 2, wherein said means for providing unidirectional dynode potential and electrode current for said multiplier comprises a voltage divider having a plurality of taps, said divider serially connected between said alternating current source and said rectifier, each tap connected to a different one of said dynodes in such manner that successive of said dynodes have connected thereto ascending values of unidirectional potential.

5. An automatic gain control system as claimed in claim 2, wherein said means for providing unidirectional dynode potential and electrode current for said multiplier comprises a voltage divider and ripple removing means coupled thereto, said divider having a plurality of intermediate taps, said divider serially connected between said alternating current source and said rectifier, each tap connected to a different intermediate one of said dynodes, said source of electrons comprising signal effects for said multiplier connected to one terminal of said voltage divider, and said collecting electrode connected to the ultimate tap of said divider, whereby successive of said dynodes have connected thereto ascending values of unidirectional potential.

ROBERT W. SANDERS.

REFERENCES CITED

The following references are of record in the file of this patent:

UNITED STATES PATENTS

| Number | Name | Date |
|---|---|---|
| 2,074,030 | Shoup | Mar. 16, 1937 |
| 2,130,152 | Perkins | Sept. 13, 1938 |
| 2,131,892 | Iams | Oct. 4, 1938 |
| 2,159,529 | Langenwalter et al. | May 23, 1939 |
| 2,160,798 | Teal | May 30, 1939 |
| 2,196,867 | Knoop | Apr. 9, 1940 |
| 2,207,355 | Shockley | July 9, 1940 |
| 2,227,015 | Schlesinger et al. | Dec. 31, 1940 |
| 2,227,031 | Schlesinger | Dec. 31, 1940 |
| 2,231,697 | Zworykin et al. | Feb. 11, 1941 |
| 2,280,303 | Reynolds | Apr. 21, 1942 |
| 2,290,775 | Snyder, Jr. | July 21, 1942 |
| 2,412,423 | Rajchman et al. | Dec. 10, 1946 |